(12) United States Patent
Eren et al.

(10) Patent No.: US 9,887,640 B2
(45) Date of Patent: Feb. 6, 2018

(54) DC-ELIMINATING CURRENT CONTROLLER FOR GRID-CONNECTED DC/AC CONVERTERS

(71) Applicants: Suzan Eren, Kingston (CA); Majid Pahlevaninezhad, Kingston (CA); Shangzhi Pan, Kingston (CA); Praveen Jain, Kingston (CA)

(72) Inventors: Suzan Eren, Kingston (CA); Majid Pahlevaninezhad, Kingston (CA); Shangzhi Pan, Kingston (CA); Praveen Jain, Kingston (CA)

(73) Assignee: SPARQ SYSTEMS INC., Kingston, Ontario (CA)

( * ) Notice: Subject to any disclaimer, the term of this patent is extended or adjusted under 35 U.S.C. 154(b) by 142 days.

(21) Appl. No.: 14/699,398

(22) Filed: Apr. 29, 2015

(65) Prior Publication Data
US 2015/0326144 A1 Nov. 12, 2015

Related U.S. Application Data

(60) Provisional application No. 61/990,841, filed on May 9, 2014.

(51) Int. Cl.
| H02M 7/5387 | (2007.01) |
| H02M 7/537 | (2006.01) |
| H02M 1/12 | (2006.01) |
| H02M 7/48 | (2007.01) |

(52) U.S. Cl.
CPC ......... *H02M 7/5387* (2013.01); *H02M 7/537* (2013.01); *H02M 1/12* (2013.01); *H02M 1/126* (2013.01); *H02M 2007/4803* (2013.01); *Y02B 70/1441* (2013.01)

(58) Field of Classification Search
CPC .................. H02M 1/12; H02M 1/126; H02M 2007/4803; H02M 7/537; H02M 7/5387; Y02B 70/1441
USPC .......................................... 363/98
See application file for complete search history.

(56) References Cited

U.S. PATENT DOCUMENTS

| 2006/0256586 A1* | 11/2006 | Ohshima ........... H02M 7/53871 363/16 |
| 2007/0007969 A1* | 1/2007 | Dai .......................... H02M 7/48 324/601 |
| 2011/0026281 A1* | 2/2011 | Chapman ................ H02M 1/12 363/65 |

\* cited by examiner

*Primary Examiner* — Jue Zhang
*Assistant Examiner* — Jye-June Lee
(74) *Attorney, Agent, or Firm* — Brion Raffoul

(57) ABSTRACT

Systems, methods, and devices which eliminate the DC current from the output of grid-connected inverters. A current controller is provided which interfaces with a grid-connected DC/AC inverter. The current controller uses a nonlinear adaptive filter which receives, as input, the output current of the inverter along with grid current frequency. The nonlinear adaptive filter estimates the DC value of the grid current and, in conjunction with an integrator, removes this DC current component. This is done by adjusting the duty cycle of the grid-connected inverter.

7 Claims, 13 Drawing Sheets

DC-ELIMINATING CURRENT CONTROLLER FOR GRID-CONNECTED DC/AC CONVERTERS

RELATED APPLICATIONS

This application is a non-provisional of U.S. Provisional Patent Application No. 61/990,841 filed May 9, 2014.

TECHNICAL FIELD

The present invention relates to control systems for grid-connected DC/AC converters. More specifically, the present invention relates to methods, systems, and devices used in the controlling of the output current of a grid connected DC/AC converter.

BACKGROUND OF THE INVENTION

Harvesting power from renewable energy sources such as wind energy and solar energy is the key to global energy sustainability. Extracting power from renewable energy sources in an efficient and profitable manner has recently been a very active research area, due to the environmental concerns and diminishing fossil fuel reserves. Grid-connected DC/AC inverters are one of the key components in renewable energy power conditioning systems. The grid-connected DC/AC inverter is responsible for delivering the power extracted from the renewable energy source to the grid. In particular, the control system of the DC/AC converter is responsible for injecting a high quality current into the utility grid. Regulatory standards for interconnecting renewable energy sources with a utility grid (e.g. IEEE 1547) impose very strict requirements on the quality of the output current. In particular, there is a very strict requirement for the amount of DC current which can be injected to the utility grid through the DC/AC inverter (less than 0.5% as imposed by IEEE 1547).

Proportional-Resonant (PR)-controllers are commonly used in controlling the output current of the DC/AC inverter with an inductive filter at the output (prior art). If a third-order LCL-filter is used at the output, a PR-controller along with a linear state-feedback is used to control the output current and to damp the resonance created by the LCL-filter (prior art). PR-controllers are unable to eliminate DC current from being injected into the grid since they cannot provide very high feedback gain for DC signals. Therefore, limiting the injected DC current is very challenging when using PR controllers.

From the above, there is therefore a need for methods and systems which can reduce if not eliminate the DC current from the output of grid-connected inverters.

SUMMARY OF INVENTION

The present invention provides systems, methods, and devices which eliminate the DC current from the output of grid-connected inverters. A current controller is provided which interfaces with a grid-connected DC/AC inverter. The current controller uses a nonlinear adaptive filter which receives, as input, the output current of the inverter along with grid voltage frequency. The nonlinear adaptive filter estimates the DC value of the grid current and, in conjunction with an integrator, removes this DC current component. This is done by adjusting the duty cycle of the grid-connected inverter.

In one aspect, the present invention provides a system for controlling a current of a DC/AC converter coupled to a power grid, the system comprising:
 a voltage controller block;
 a compensation block for providing high gains to a signal at a fundamental frequency of said system and for providing high signal gains at harmonic frequencies of said fundamental frequency, said compensation block receiving at least one version of an output of said voltage controller block;
 a nonlinear adaptive filter for estimating a DC component of a grid current, said filter receiving at least one output of said converter; and
 circuitry for subtracting said DC component from a current output of said converter by way of a duty cycle for said converter.

In another aspect, the present invention provides a method for controlling a grid connected DC/AC converter, the method comprising:
 a) receiving a grid current being output by said converter;
 b) extracting a grid voltage frequency from a grid voltage being output by said converter;
 c) estimating a DC component of said grid current using said grid voltage frequency and said grid current;
 d) removing said DC component from said grid current by controlling a duty cycle for said converter.

BRIEF DESCRIPTION OF THE DRAWINGS

The embodiments of the present invention will now be described by reference to the following figures, in which identical reference numerals in different figures indicate identical elements and in which.

DETAILED DESCRIPTION

The present invention includes a new current controller that is able to eliminate the DC component of the grid-connected DC/AC inverter output current. The method and system are based on the nonlinear adaptive filtering of the output current in order to extract the DC value of the output current. Once the DC value is extracted, it can be eliminated through an integrator, since it provides a very high gain for the DC signal.

Figure 1:
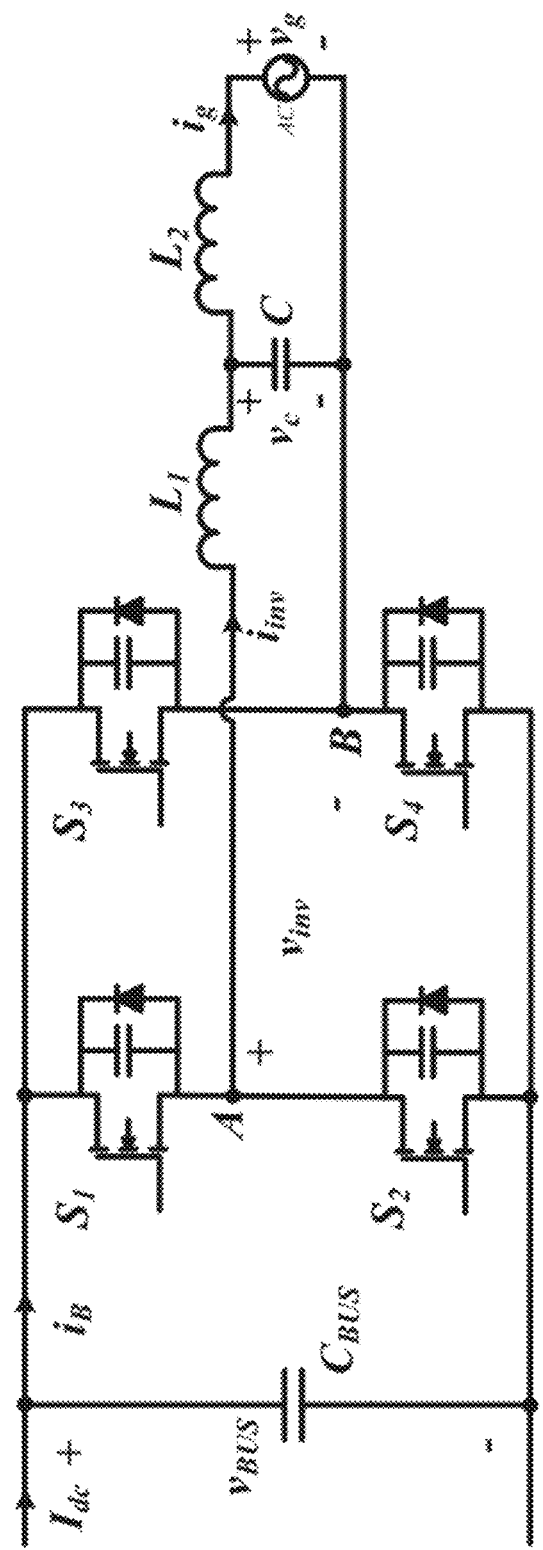
FIG. 1 is a schematic of a grid-connected DC/AC with an LCL-filter.

FIG. 1 shows the schematic of a grid-connected DC/AC with an LCL-filter. LCL filters are widely used at the output of the DC/AC in order to filter out the high frequency components produced by switching and to deliver a high quality current to the utility grid. LCL filters provide better attenuation than comparably sized L-filters (i.e., −60 dB/dec for LCL filters and −20 dB/dec for L filters).

Figure 2:
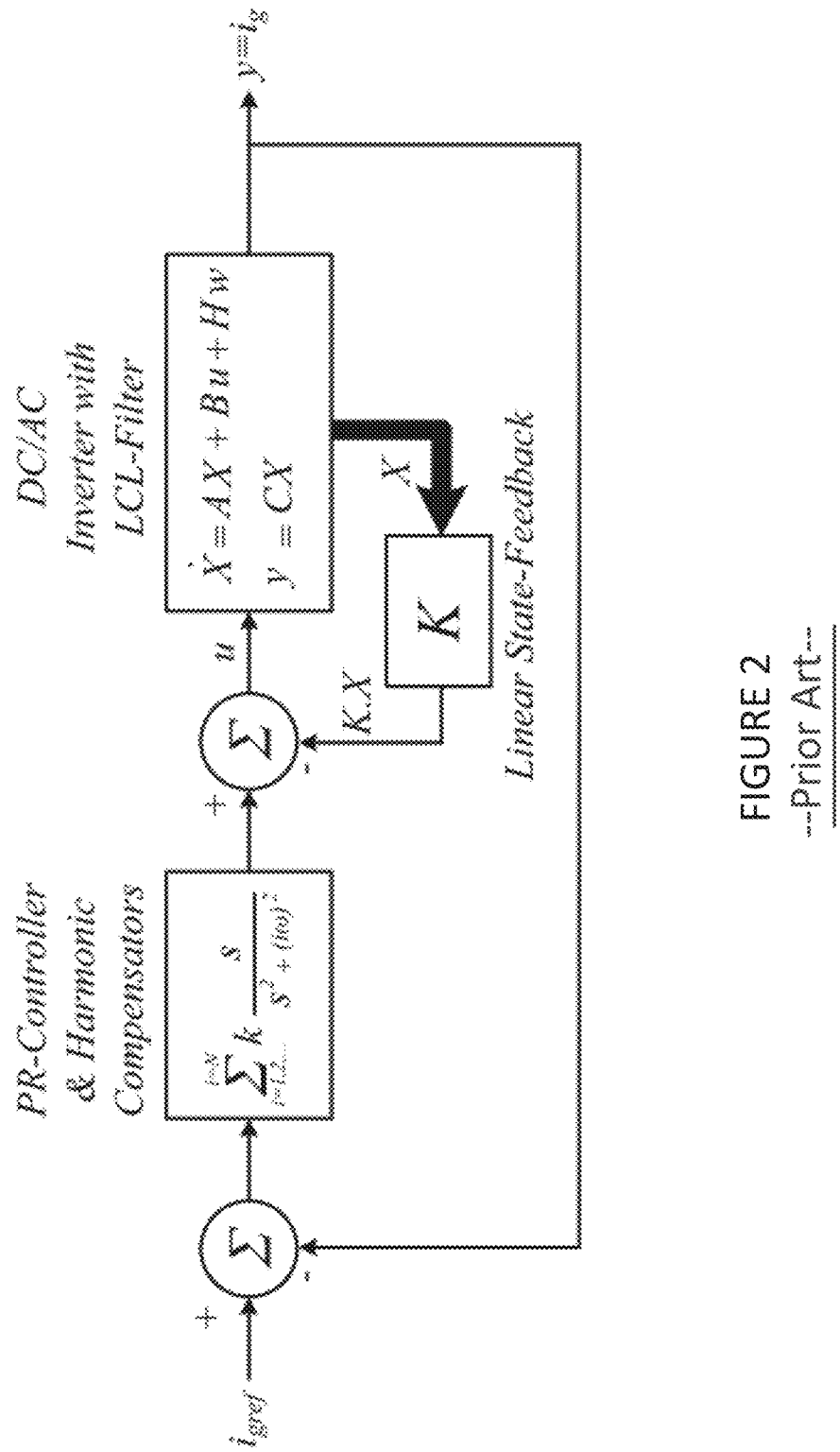
FIG. 2 is a block diagram of the closed-loop current control system for a grid-connected DC/AC inverter with an LCL-filter according to the prior art.

FIG. 2 shows the block diagram of the closed-loop current control system for a grid-connected DC/AC inverter with an LCL-filter (prior art). According to FIG. 2, the current control loop includes PR-controllers along with a linear state-feedback controller. The resonant controllers are responsible for the sinusoidal reference tracking of the grid current as well as for eliminating the current harmonics by providing very high loop gains at the harmonic frequencies. The linear state-feedback guarantees the stability of the closed-loop control system by placing the closed-loop poles on the left-half plane.

The challenge with the closed-loop control shown in FIG. 2 is that the controller is not able to eliminate the DC current injected to the grid. In one aspect, the present invention provides a closed-loop control system which is able to eliminate the DC component of the grid current. The DC current injection must be highly limited due to the grid regulatory standards (e.g. IEEE 1547). In the present invention, the DC value of the grid current is extracted through a nonlinear adaptive filter. The nonlinear adaptive filter of the invention is able to extract a very small DC value from a sinusoidal waveform. Based on this, it is well-suited for grid connected power conditioning applications. The injected grid current is a sinusoidal current with a DC component:

$$i_g = I_{DC} + I_g \sin(\omega t) \tag{1}$$

The objective of the nonlinear adaptive filter is to extract $I_{DC}$ from $i_g$ without significantly compromising the dynamics of the signal. The new state variables for the nonlinear adaptive observer are defined as:

$$y_1 = i_g \tag{2}$$

$$y_2 = \frac{1}{\omega} \dot{y}_1 \tag{3}$$

According to Eqns. (1)-(3), the system dynamics is given by:

$$\dot{Y} = F \cdot Y + G \cdot \theta \tag{4}$$

where: $\theta = I_{DC}$, $Y = \begin{pmatrix} y_1 \\ y_2 \end{pmatrix}$, $F = \begin{pmatrix} 0 & \omega \\ -\omega & 0 \end{pmatrix}$, and $G = \begin{pmatrix} 0 \\ \omega \end{pmatrix}$.

In Eqn (4), $\theta$ is the unknown parameter, which has to be estimated. Since the only observable output is $y_1$, the following change of variable is used to be able to estimate $\theta$.

$$\begin{pmatrix} \xi_1 \\ \xi_2 \end{pmatrix} = \begin{pmatrix} 1 & 0 \\ -1 & 1 \end{pmatrix} \begin{pmatrix} y_1 \\ y_2 \end{pmatrix} + \begin{pmatrix} 0 \\ -1 \end{pmatrix} \theta \tag{5}$$

The dynamics of the system with new variables is derived as:

$$\dot{\chi} = F' \cdot \chi + G' \cdot \theta \tag{6}$$

$$\chi = \begin{pmatrix} \xi_1 \\ \xi_2 \end{pmatrix}, F' = \begin{pmatrix} \omega & \omega \\ -2\omega & -\omega \end{pmatrix}, \text{ and } G' = \begin{pmatrix} \omega \\ 0 \end{pmatrix}.$$

where:

It is worthwhile to note that $\xi_1$ is the measurable variable. The nonlinear adaptive observer for Eqn. (6) is given by:

$$\begin{pmatrix} \dot{\hat{\xi}}_1 \\ \dot{\hat{\xi}}_2 \end{pmatrix} = \begin{pmatrix} \omega & \omega \\ -2\omega & -\omega \end{pmatrix} \begin{pmatrix} \hat{\xi}_1 \\ \hat{\xi}_2 \end{pmatrix} + \begin{pmatrix} \omega \\ 0 \end{pmatrix} \hat{\theta} + \begin{pmatrix} \alpha_1 \\ \alpha_2 \end{pmatrix} \tilde{\xi} \tag{7}$$

along with the following adaptive estimation for $\theta$:

$$\dot{\hat{\theta}} = \gamma \omega \tilde{\xi}_1 \tag{8}$$

In Eqns. (7)-(8), $\tilde{\xi}_1 = \xi_1 - \hat{\xi}_1$, and $\alpha_1$, $\alpha_2$ are the observer gains.

The existence and boundedness of the solution of Eqn. (7) are guaranteed by the following energy function:

$$V = \frac{1}{2}\tilde{\xi}_1^2 + \frac{1}{2}\tilde{\xi}_2^2 + \frac{1}{2\gamma}\tilde{\theta}^2 \tag{9}$$

where $\tilde{\theta}_1 = \theta_1 - \hat{\theta}_1$ and $\gamma$ is a positive real constant which determines the speed of convergence for the adaptive law.

The derivative of the Lyapunov function is given by:

$$\dot{V} = \tilde{\xi}_1 \dot{\tilde{\xi}}_1 + \tilde{\xi}_2 \dot{\tilde{\xi}}_2 + \tilde{\theta} \dot{\tilde{\theta}} \tag{10}$$

Using the error dynamics given by:

$$\begin{pmatrix} \dot{\tilde{\xi}}_1 \\ \dot{\tilde{\xi}}_2 \end{pmatrix} = \begin{pmatrix} 0 & \omega \\ 0 & -\omega \end{pmatrix} \begin{pmatrix} \tilde{\xi}_1 \\ \tilde{\xi}_2 \end{pmatrix} + \begin{pmatrix} \omega \\ 0 \end{pmatrix} \tilde{\theta} - \begin{pmatrix} \alpha_1 \\ \alpha_2 \end{pmatrix} \tilde{\xi} \tag{11}$$

and the adaptive law given by Eqn. (8), the derivative of the energy function is given by:

$$\dot{V} = -\alpha_1 \tilde{\xi}_1^2 - \omega \tilde{\xi}_2^2 \tag{12}$$

where $\alpha_1$ is a positive real value and $\alpha_2$ is set to be equal to $\omega$.

According to Eqn. (12), the derivative of the Lyapunov function is negative semi-definite (it is not negative definite). Eq. (12) only guarantees that the error signals, $\tilde{\xi}_1$ and $\tilde{\xi}_2$ converge to zero. However, only the boundedness of $\tilde{\theta}$ is guaranteed and not the asymptotic convergence. The particular structure of the adaptive observer of the invention provides the necessary and sufficient condition to prove the asymptotic convergence of $\tilde{\theta}$. The asymptotic convergence is proven by using the persistency of excitation theorem. This theorem states that if the update law $\dot{\hat{\theta}}$ is persistently excited, the global asymptotic stability is concluded for the estimation errors. In particular, in order to have persistency of excitation, the following condition must be satisfied for two positive real values T and k:

$$\int_t^{t+T} \dot{\hat{\theta}}^2(\tau) d\tau \geq k > 0 \tag{13}$$

Because the grid current is a sinusoidal signal with a frequency of ω, the update law, $\dot{\hat{\theta}} = \gamma\omega\tilde{\xi}_1$, is constantly being excited through $\tilde{\xi}_1$. Thus, the update law in the adaptive observer of the invention is persistently excited. The persistency of excitation theorem proves the globally exponentially stable equilibrium point (0,0,0) for ($\tilde{\xi}_1, \tilde{\xi}_2, \tilde{\theta}$).

Figure 3:
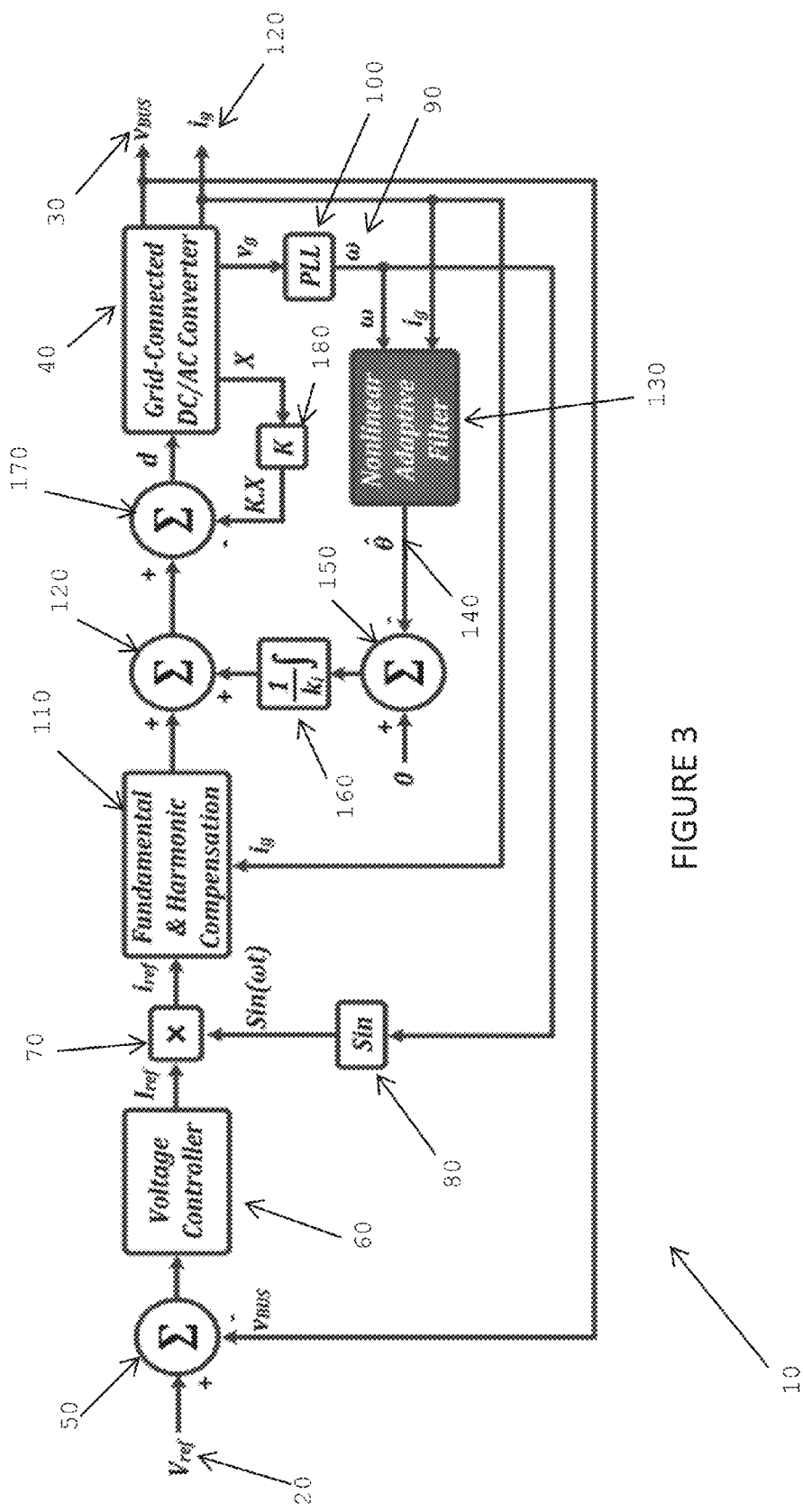
FIG. 3 is a block diagram of the DC-eliminating current control system according to one aspect of the invention.

FIG. 3 shows the block diagram of the DC-eliminating current control system according to one aspect of the invention. According to this figure, the closed-loop control system includes an external voltage loop and an internal current loop. The internal current loop is responsible for controlling the grid current while the external voltage loop is responsible for regulating the DC-bus voltage. The external voltage loop also determines the amplitude of the grid current reference signal. According to FIG. 3, the current loop includes three main parts. The first part is the fundamental and harmonic compensation block. This provides a very high gain at the fundamental frequency (line frequency) as well as high gains at the frequencies of the current harmonics. The second part is the DC-eliminating controller. This uses the nonlinear adaptive filter to extract the DC value of the grid current and also uses an integrator to remove the DC component of the grid current. The third part is the linear state-feedback. This damps the natural resonance created by the LCL-filter.

Referring to FIG. 3, the current control system 10 has, as input, a reference voltage 20. From this reference voltage 20 is subtracted the bus voltage 30 which is output from a grid-connected DC/AC converter 40. The subtraction is done by way of an adder block 50. The output of the adder block 50 is then received by a voltage controller 60 which produces a reference current $I_{ref}$. This reference current is multiplied by multiplier 70 with a value of sin(ωt) from a sine block 80. The sine block receives the value of ω90 from a PLL (phase locked loop) block 100 that derives ω from a grid voltage $i_g$ from the converter 40. The output of multiplier 70 is a reference current $i_{ref}$ that is received by a compensation block 110. As noted above, the compensation block 110 provides a very high gain at the fundamental frequency (line frequency) as well as high gains at the frequencies of the current harmonics. The compensation block 110 receives, along with the reference current $i_{ref}$, the grid current $i_g$ that is output from the converter 40. The output of the compensation block 110 is fed to a summation block 120.

Also from FIG. 3, the other input to the summation block 120 is the result of the loop that includes the nonlinear adaptive filter 130. The nonlinear adaptive filter 130 receives, as input, the frequency ω90 from the PLL block 100 and the grid current $i_g$ 120 from the converter 40. As output, the filter 130 produces the estimated DC current $\hat{\theta}$ 140. This estimated DC current is then subtracted from 0 by a summing block 150. The result of summing block 150 is then integrated by integration block 160 and the result is received by summation block 120. The result from summation block 120 is received by another summation block 170 that is used in a linear state feedback loop with the converter 40 as shown in FIG. 2.

In the linear state feedback loop, the result of the summation block 170 is a duty cycle d that is fed into the converter 40. The converter 40 produces a value X that is multiplied with a value K by multiplier 180. The result of multiplier 180 is subtracted by summation block 170 from the result of summation block 120.

Figure 4:
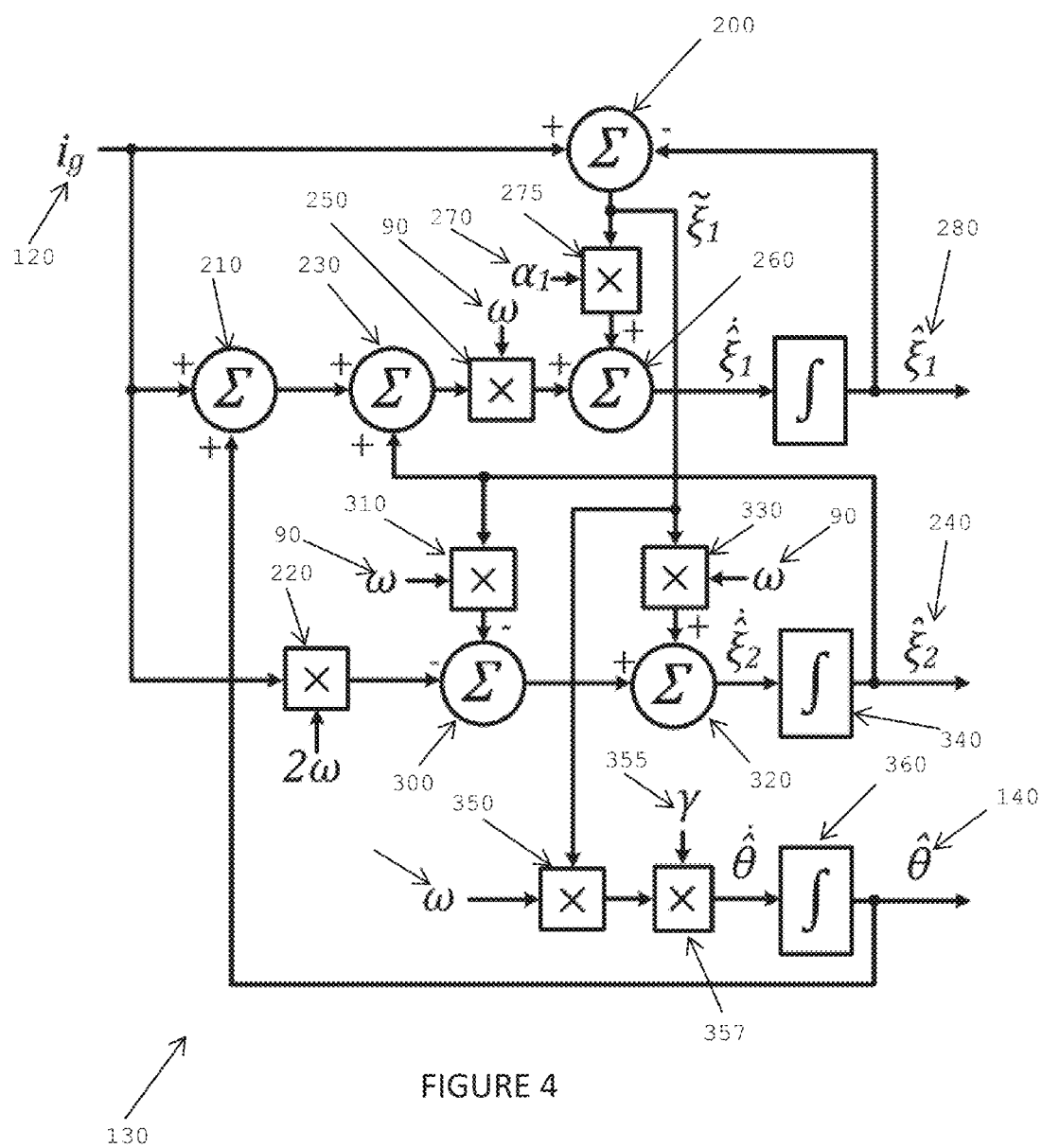
FIG. 4 is a detailed block diagram of a nonlinear adaptive filter according to another aspect of the invention.

A detailed block diagram of the nonlinear adaptive filter 130 is shown in FIG. 4. This nonlinear adaptive filter precisely estimates the DC value of the grid current without compromising the dynamics of the closed loop system.

Referring to FIG. 4, the nonlinear adaptive filter 130 has quite a number of components. There are two inputs to the filter 130: the grid current $i_g$ 120, and the grid voltage frequency ω 90. The output of the filter 130 is the estimated DC voltage $\hat{\theta}$ 140. The grid current 120 is fed to a summation block 200, a summation block 210, and a multiplication block 220. The summation block 210 adds the grid current 120 to the estimated DC current 140 and the result is sent to another summation block 230. The summation block 230 receives this result and adds a first estimated error value 240. The result is then multiplied with the frequency 90 by multiplier 250. The result of multiplier 250 is added by summation block 260 to the result of multiplier block 275. Multiplier block 275 multiplies a value $\alpha_1$ 270 with the result from summation block 200. This result from summation block 200 is from subtracting a second estimated error value 280 from the grid current 120.

Returning to summation block 260, the result of this summation block 260 is integrated by way of integration block 290 to result in the second estimated error value 280.

As noted above, the grid current 120 is received by multiplier 220. From FIG. 4, the grid current 120 is multiplied by a value equal to twice the frequency 90 and the result is sent to summation block 300. Summation block 300 subtracts the result of multiplication block 220 from the negative of the result of multiplication block 310. Multiplication block 310 multiplies the frequency 90 with the first estimated error value 240.

As can be seen from FIG. 4, the result of summation block 300 is added by summation block 320 to the result of multiplication block 330. Multiplication block 330 multiplies frequency 90 with the result of summation block 200. The result of summation block 320 is integrated by way of integration block 340 to result in the first estimated error value 240.

In the final leg of the filter 130, the frequency 90 is multiplied by multiplier block 350 with the result of summation block. The result is multiplied by a coefficient value γ 355 by multiplier block 357. The result of multiplier block 357 is then integrated by way of integration block.

Figure 5A:
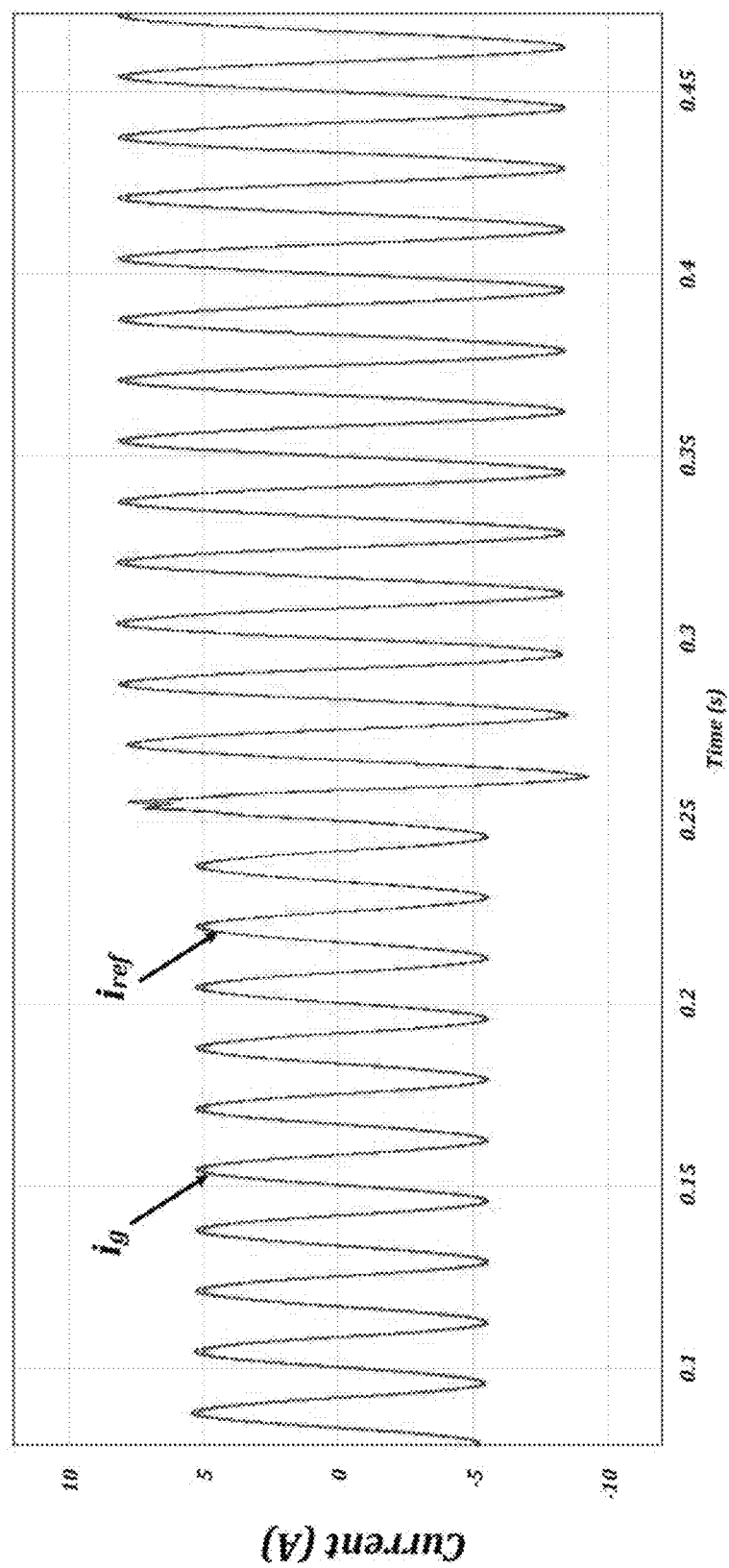
FIGS. 5A and 5B show the performance of a conventional PR-controller with a linear state-feedback.
Figure 5B:
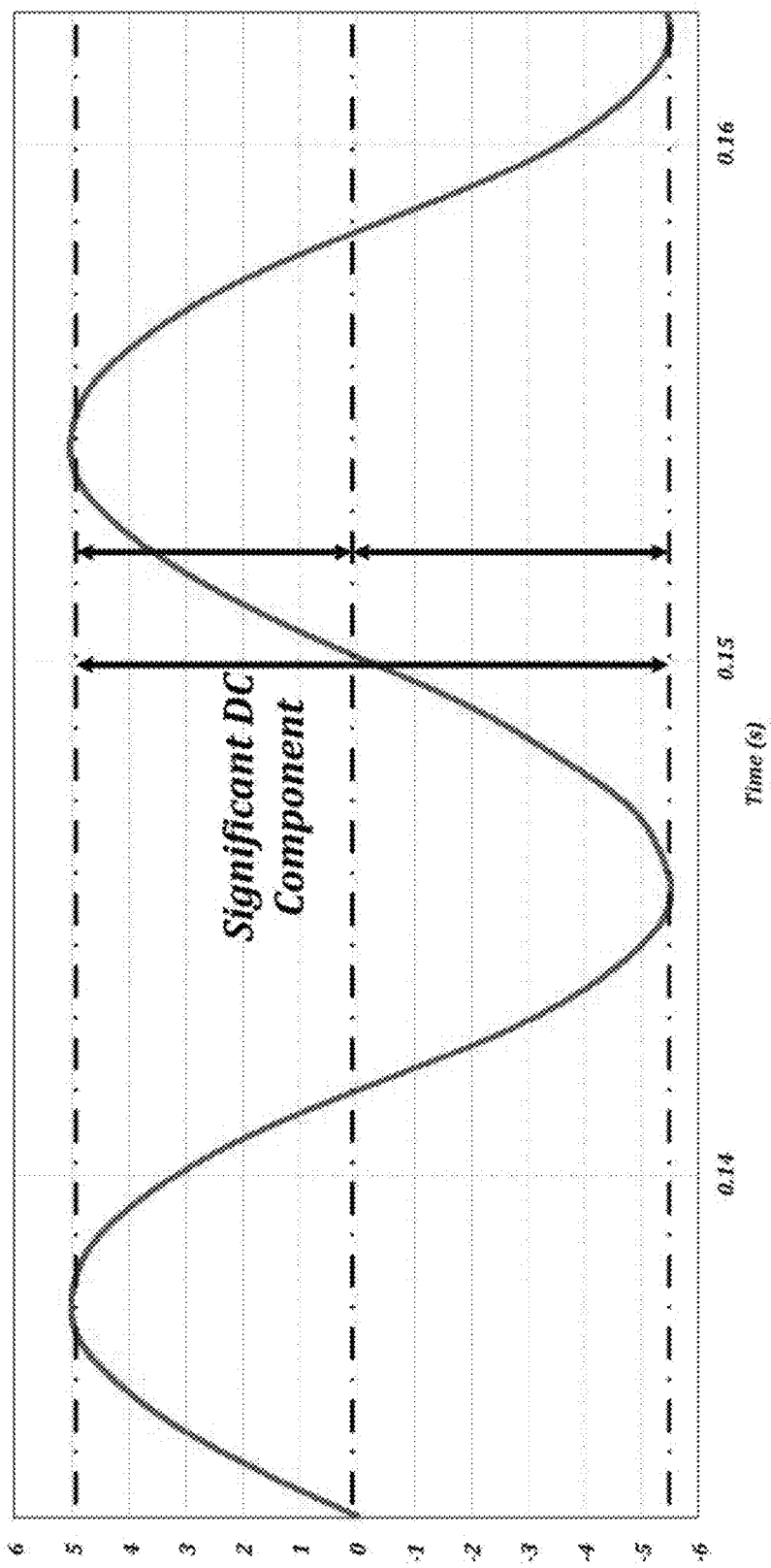
Figure 6A:
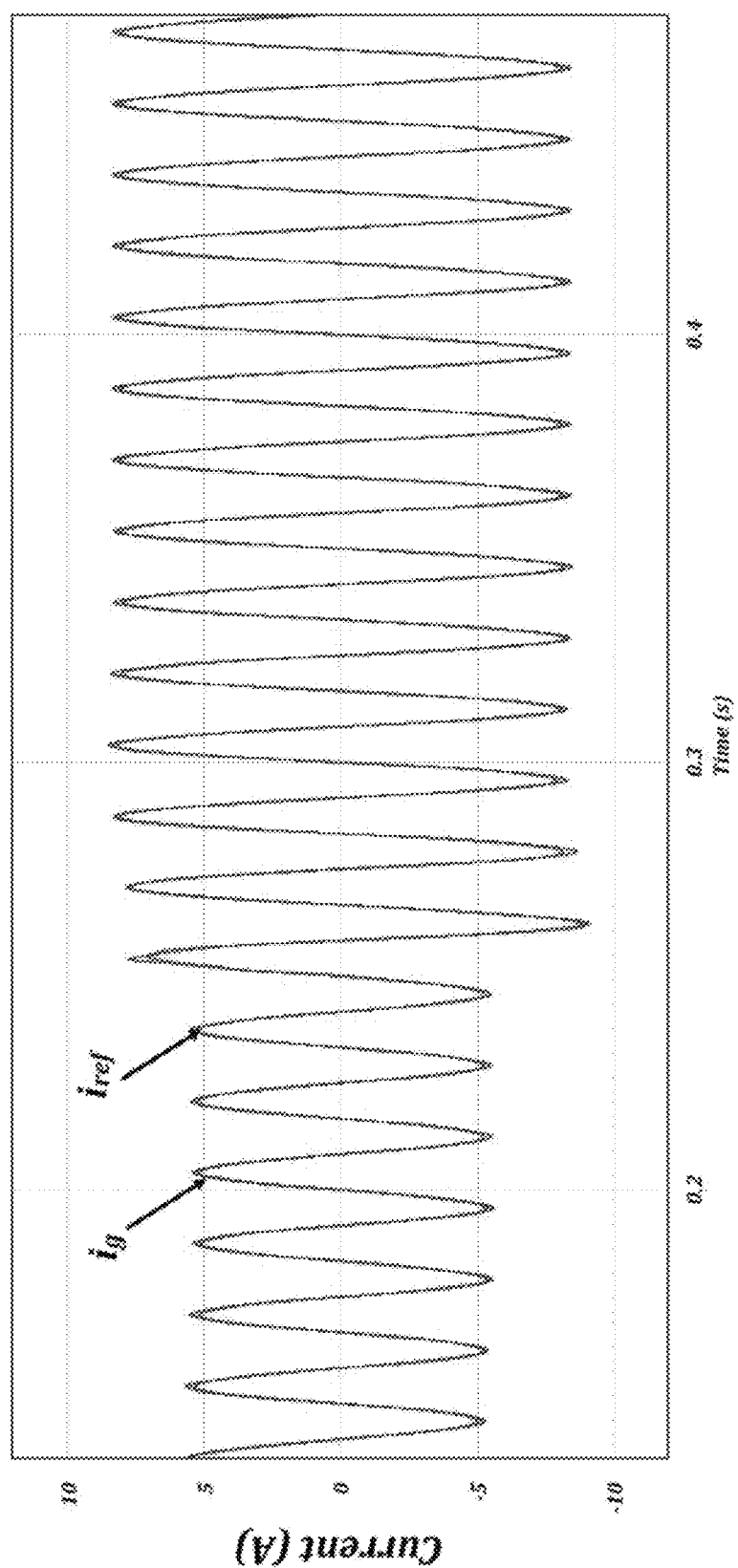
FIGS. 6A and 6B show the performance of the DC-eliminating current controller of FIG. 3.
Figure 6B:
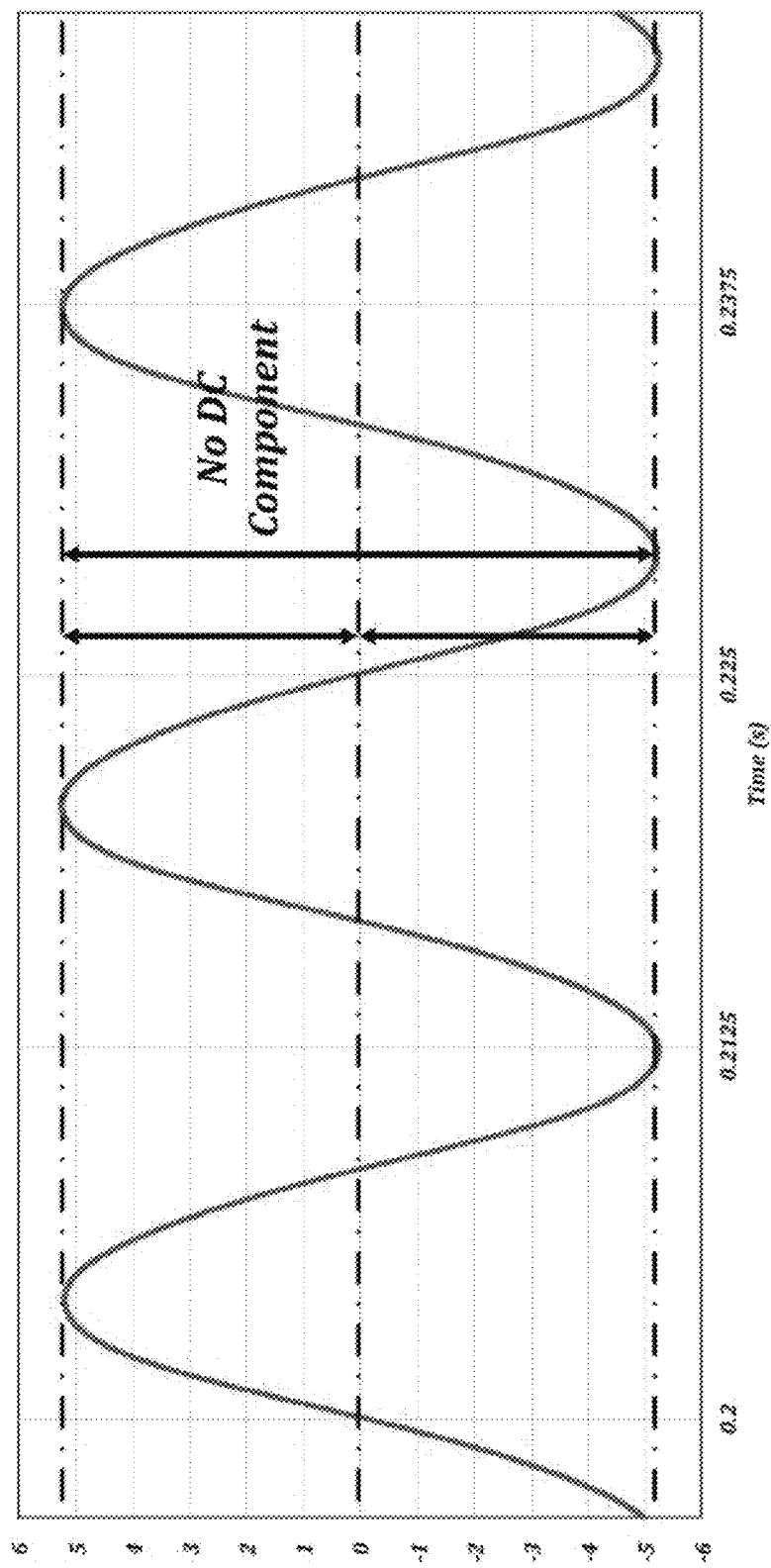

In order to evaluate the performance of the DC-eliminating current controller of the invention, the transient response of the closed-loop control system is examined using the conventional PR-controller with a linear state-feedback and the DC-eliminating controller. FIGS. 5A and 5B show the performance of the conventional PR-controller with a linear state-feedback. FIGS. 5A and 5B show that the current has a significant amount of DC. It should be noted that this grid current cannot satisfy the regulatory standards for the grid-connected converters. FIGS. 6A and 6B show the performance of the DC-eliminating current controller of the invention. According to FIGS. 6A and 6B, the current controller is able to effectively remove the DC component of the grid current and successfully satisfy the strict regulatory standard of the grid interconnection.

Figure 7:
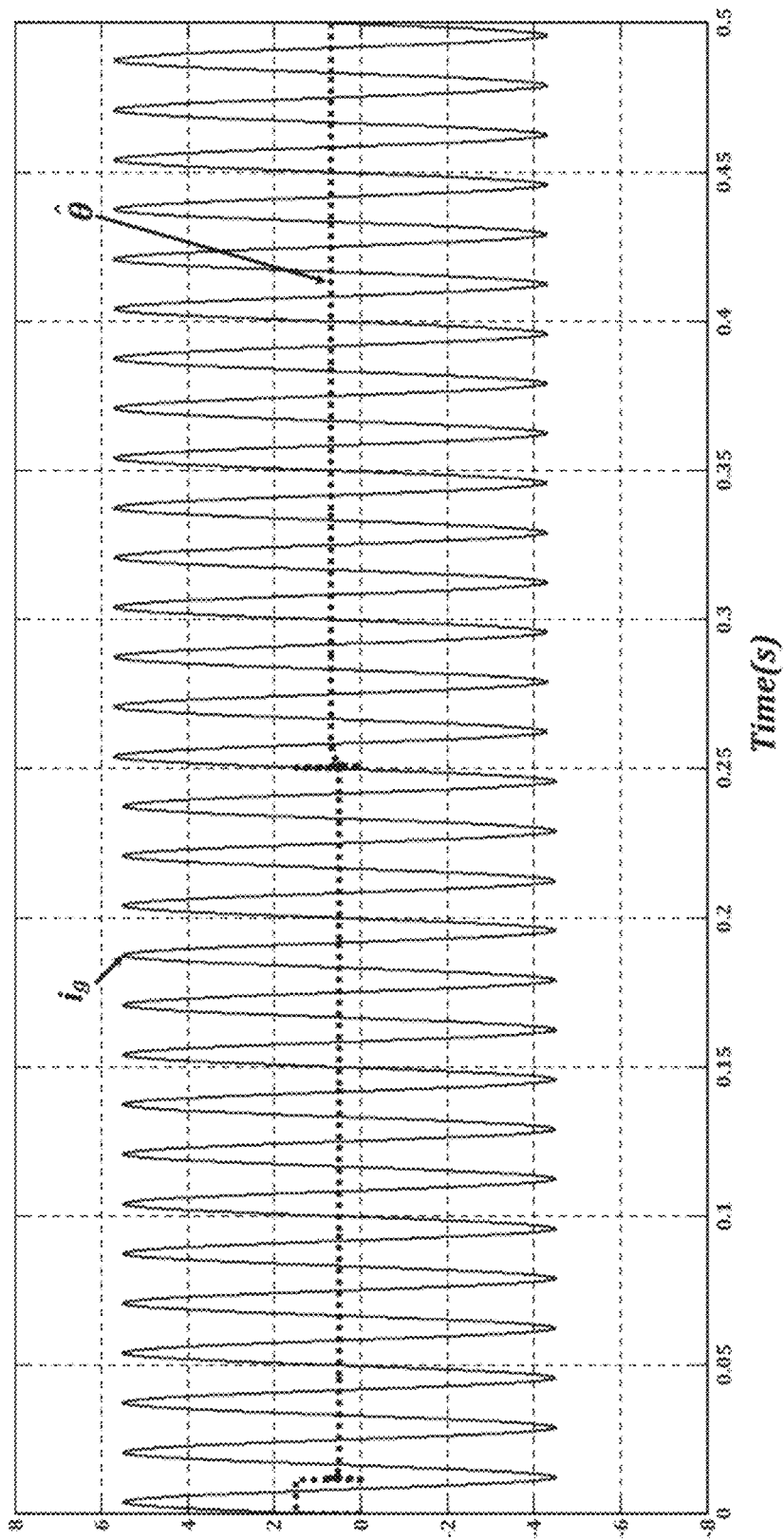
FIG. 7 shows the transient response of the nonlinear adaptive filter illustrated in FIG. 4.
Figure 8:
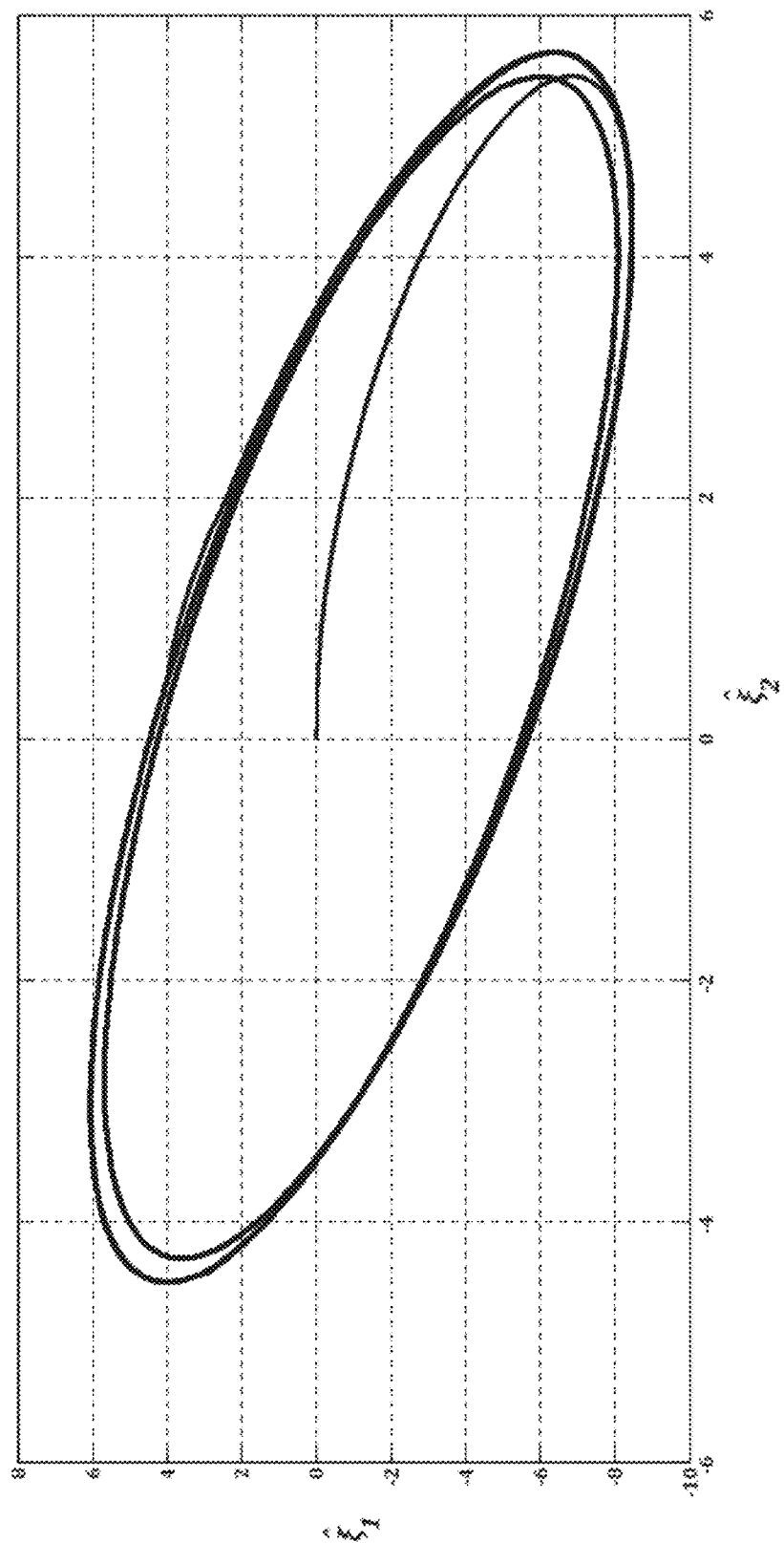
FIG. 8 shows the trajectory of the error signals used in the system when a DC current step change is applied.
Figure 9:
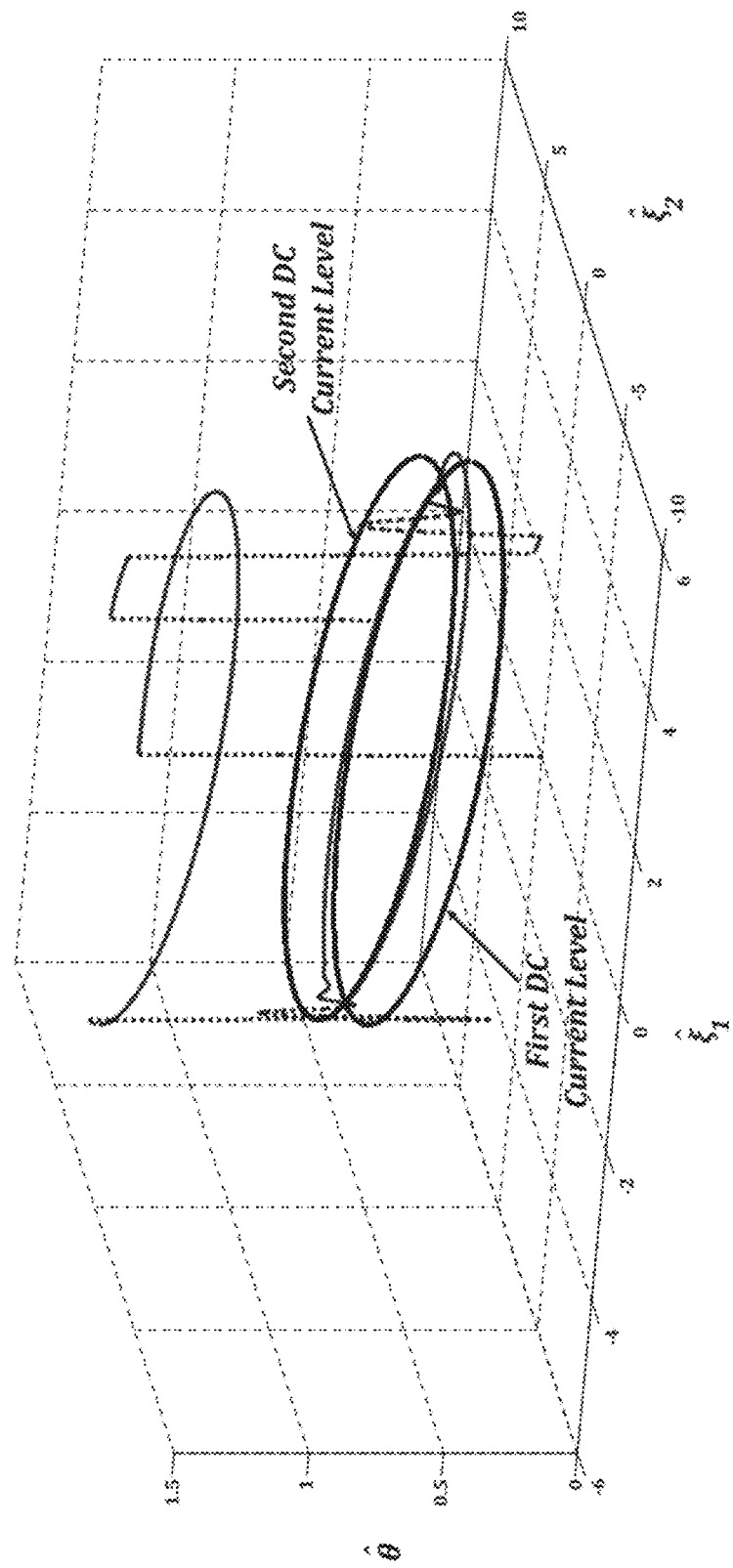
FIG. 9 shows the trajectory of the error signals and of the estimated DC component when a DC current step change is applied.

FIG. 7 shows the transient response of the nonlinear adaptive filter of the invention. FIG. 7 shows that the nonlinear adaptive filter of the invention is able to very quickly and precisely estimate a very small DC value of the grid current. FIG. 8 shows the trajectory of $\hat{\xi}_1$ and $\hat{\xi}_2$ when the step change is applied. According to this figure, the system is steered from first DC current level to the second DC current level when the step change is applied. Also, FIG. 9 shows the trajectory of the system for this transient. The steady-state limit cycles for two DC current levels are evident in this figure.

Figure 10:
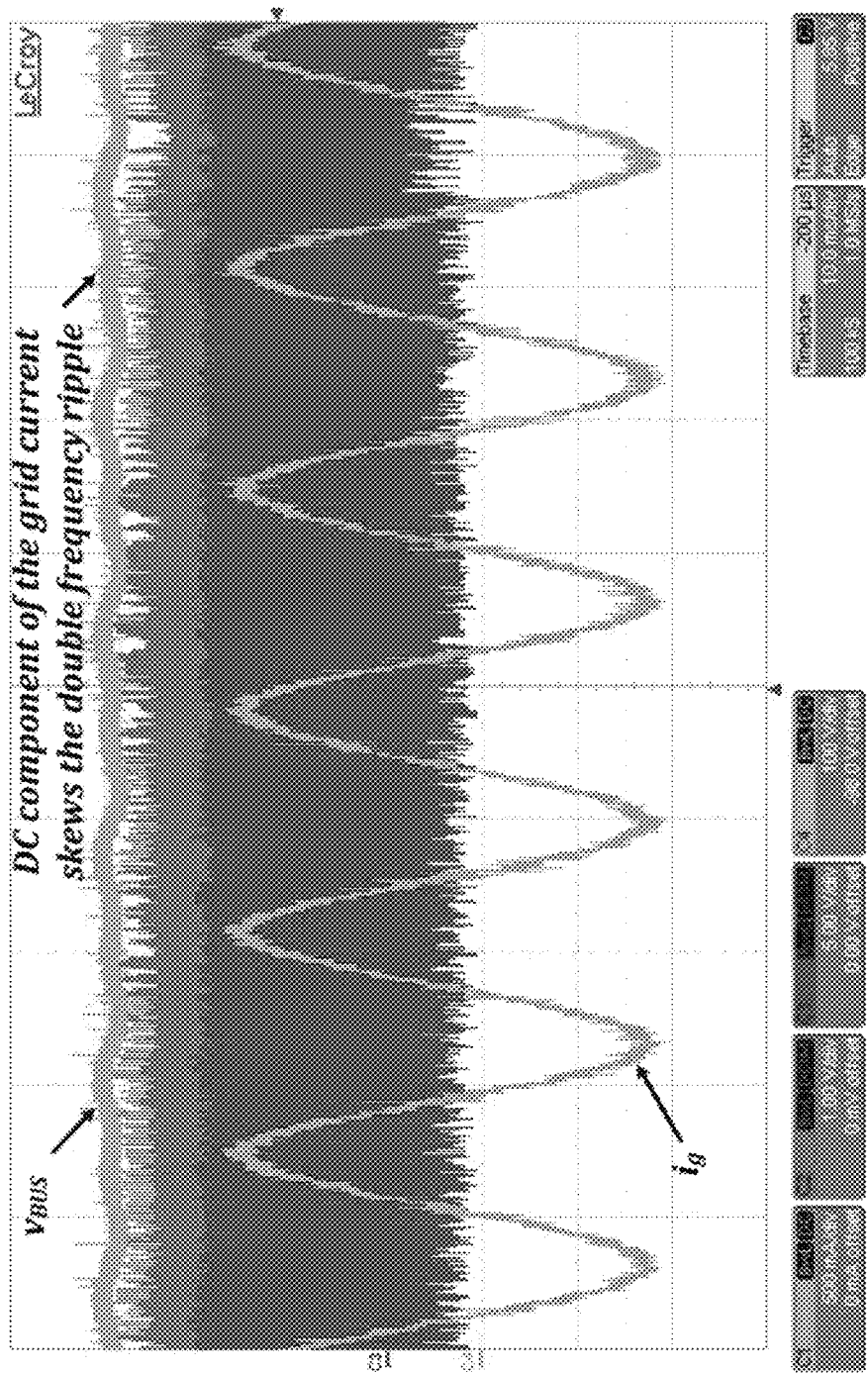
FIG. 10 shows experimental waveforms (including grid current and bus voltage) of the DC/AC converter for a conventional current control system.
Figure 11:
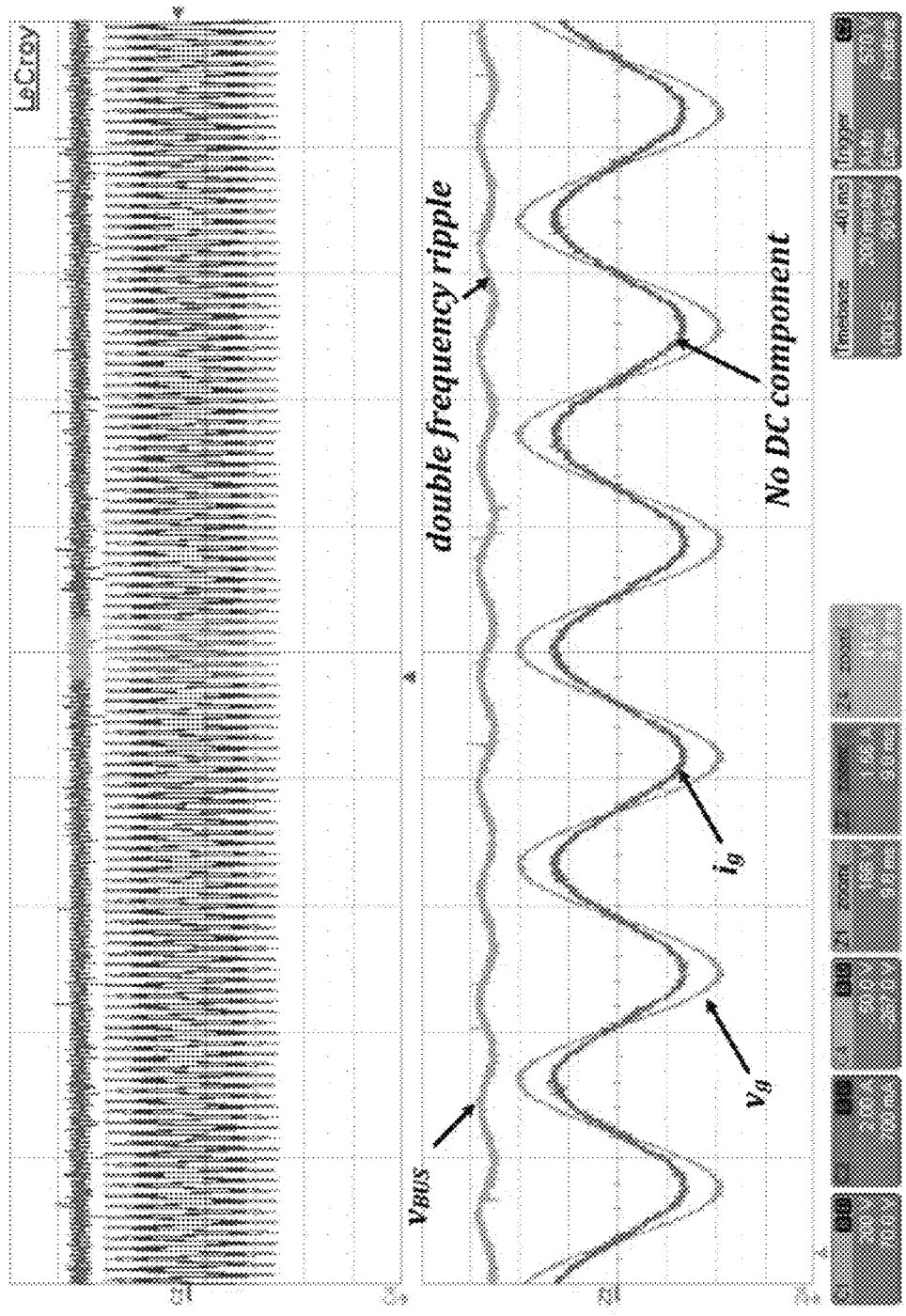
FIG. 11 shows experimental waveforms (including grid current and bus voltage) for the DC-eliminating current controller according to one aspect of the invention.

FIG. 10 shows the experimental waveforms of the DC/AC converter for the conventional current control system while FIG. 11 shows the same waveforms for the DC-eliminating current controller of the invention. FIG. 10 shows that a slight DC component of the grid current skews the double-frequency ripple of the DC-bus. This current waveform cannot satisfy the grid regulatory standard imposed by IEEE 1547 for grid interconnected systems as this standard limits the current to 0.5% of the nominal current. On the other hand, the experimental waveforms in FIG. 11 confirm that the DC-eliminating current controller of the invention effectively removes the DC component of the grid current and injects a DC-free current to the utility current.

It should be noted that the invention may also be practiced using a suitably configured ASIC. As well, the invention may be practiced as a suitably configured and programmed general purpose computer coupled to a grid-connected converter.

The embodiments of the invention may be executed by a computer processor or similar device programmed in the manner of method steps, or may be executed by an electronic system which is provided with means for executing these steps. Similarly, an electronic memory means such as computer diskettes, CD-ROMs, Random Access Memory (RAM), Read Only Memory (ROM) or similar computer software storage media known in the art, may be programmed to execute such method steps. As well, electronic signals representing these method steps may also be transmitted via a communication network.

Embodiments of the invention may be implemented in any conventional computer programming language. For example, preferred embodiments may be implemented in a procedural programming language (e.g. "C") or an object-oriented language (e.g. "C++", "java", "PHP", "PYTHON" or "C#"). Alternative embodiments of the invention may be implemented as pre-programmed hardware elements, other related components, or as a combination of hardware and software components.

Embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink-wrapped software), preloaded with a computer system (e.g., on system ROM or fixed disk), or distributed from a server over a network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

A person understanding this invention may now conceive of alternative structures and embodiments or variations of the above all of which are intended to fall within the scope of the invention as defined in the claims that follow.

We claim:

1. A system for controlling a current of a DC/AC converter coupled to a power grid, the system comprising:
   a voltage controller block;
   a compensation block for providing high gains to a signal at a fundamental frequency of said system and for providing high signal gains at harmonic frequencies of said fundamental frequency, said compensation block receiving at least one version of an output of said voltage controller block;
   a nonlinear adaptive filter for estimating a DC component of a grid current using a grid voltage frequency and said grid current, said filter receiving at least one output of said converter, wherein said filter comprises a plurality of processing blocks for processing a first error signal and a second error signal, said first error signal being based on said grid current and an iterative estimation of said DC component, said second error signal being based on said first error signal, wherein said first and second error signals converge to zero and iterative estimations of said DC component are given by $\dot{\hat{\theta}} = \gamma \omega \tilde{\xi}_1$, where $\hat{\theta}$ is said estimation of said DC component, $\gamma$ is a constant value that determines a speed of convergence for said estimates of said DC component, $\omega$ is said grid voltage frequency, and $\tilde{\xi}_1$ is said first error signal; and
   circuitry for subtracting said DC component from a current output of said converter by way of controlling a duty cycle for said converter.

2. The system according to claim 1, wherein said filter receives a grid current output of said converter and a frequency of a grid voltage from said converter.

3. The system according to claim 2, wherein said frequency of said grid voltage is derived from said grid voltage by a phase locked loop block.

4. The system according to claim 1, wherein said compensation block receives a grid current from said converter.

5. The system according to claim 1, wherein said circuitry comprises at least one integration block for integrating said DC component.

6. A method for controlling a grid connected DC/AC converter, the method comprising:
   a) receiving a grid current being output by said converter;
   b) extracting a grid voltage frequency from a grid voltage being output by said converter;
   c) estimating a DC component of said grid current using said grid voltage frequency and said grid current to produce an estimated DC component, wherein said estimating is iteratively based on said grid voltage frequency and at least one error signal, and wherein said at least one error signal is based on said grid voltage frequency and said estimated DC component, and wherein said at least one error signal converges to zero;
   d) removing said DC component from said grid current by controlling a duty cycle for said converter.

7. The method according to claim 6, wherein step d) is performed by way of integration.

* * * * *